United States Patent
Yoshitake et al.

(10) Patent No.: US 6,420,504 B1
(45) Date of Patent: Jul. 16, 2002

(54) BRANCHED SILOXANE/SILALKYLENE COPOLYMER, SILICONE-CONTAINING ORGANIC POLYMER, AND PROCESS FOR PRODUCING THE SAME

(75) Inventors: Makoto Yoshitake; Haruhiko Furukawa; Yoshitsugu Morita, all of Chiba (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/601,987

(22) PCT Filed: Dec. 11, 1998

(86) PCT No.: PCT/JP98/05627

§ 371 (c)(1),
(2), (4) Date: Aug. 9, 2000

(87) PCT Pub. No.: WO00/35925

PCT Pub. Date: Jun. 22, 2000

(51) Int. Cl.$^7$ ................................. C08F 230/08
(52) U.S. Cl. .............. 526/279; 525/100; 525/101; 528/15; 528/25; 528/26; 528/31; 528/32; 528/33; 528/35; 556/431; 556/434; 556/435; 556/479
(58) Field of Search ................. 556/431, 434, 556/435, 479; 526/279; 528/25, 26, 31, 32, 33, 35, 15; 525/100, 101

(56) References Cited

U.S. PATENT DOCUMENTS

| | | | | |
|---|---|---|---|---|
| 5,929,187 A | * | 7/1999 | Yoshitake | 528/15 |
| 6,169,156 B1 | * | 1/2001 | Yoshitake | 528/31 |
| 6,184,407 B1 | * | 2/2001 | Yoshitake et al. | 556/434 |
| 6,238,745 B1 | * | 5/2001 | Morita et al. | 427/387 |
| 6,280,748 B1 | * | 8/2001 | Morita et al. | 424/401 |

FOREIGN PATENT DOCUMENTS

| | | | |
|---|---|---|---|
| EP | 0 963 751 A2 | * | 12/1999 |
| EP | 1 006 165 A2 | * | 6/2000 |
| JP | 01254719 A | | 10/1989 |
| JP | 1-254719 | | 10/1989 |
| JP | 01319518 A | | 12/1989 |
| JP | 1319518 | | 12/1989 |
| JP | 7-173178 | | 7/1995 |
| JP | 07-196975 | | 8/1995 |
| JP | 7-196975 | | 8/1995 |
| JP | 11-1485 | | 1/1999 |
| JP | 11-1530 | | 1/1999 |

* cited by examiner

*Primary Examiner*—Robert Dawson
*Assistant Examiner*—Jeffrey B. Robertson
(74) *Attorney, Agent, or Firm*—Duane Morris LLP

(57) ABSTRACT

Radical-polymerizable organic group-containing branched siloxane-silalkylene copolymer represented by the general formula:

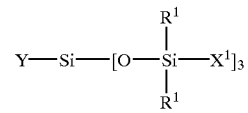

{in the formula, Y is a radical-polymerizable organic group, $R^1$ is 1–10 carbon alkyl or aryl, and $X^1$ is a silyl-alkyl group represented by the following formula in the case when i=1:

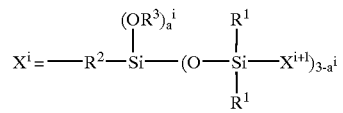

(in the formula, $R^1$ is the same as aforesaid, $R^2$ is 2–10 carbon alkylene, $R^3$ is 1–10 carbon alkyl, and $X^{i+1}$ is a group selected from the group comprising a hydrogen atom, 1–10 carbon alkyl, aryl and the aforesaid silylalkyl group, i is an integer from 1 to 10, which indicates the generation number of the said silylalkyl group and $a^i$ is an integer from 0 to 3)}, silicone-containing organic polymer made by polymerizing the said copolymer and method for production thereof.

5 Claims, 7 Drawing Sheets

BRANCHED SILOXANE/SILALKYLENE COPOLYMER, SILICONE-CONTAINING ORGANIC POLYMER, AND PROCESS FOR PRODUCING THE SAME

FIELD OF THE INVENTION

This invention concerns a novel branched siloxane-silalkylene copolymer which contains one radical-polymerizable organic group per molecule, a silicone-containing organic polymer made by polymerizing the copolymer and a process for producing the same.

BACKGROUND OF THE INVENTION

Organopolysiloxanes which contain one radical-polymerizable organic group per molecule, such as an acryloxy group or methacryloxy group are known, for example straight-chain dimethylpolysiloxanes of which only one end is blocked with methacryloxypropyl group, and branched methylpolysiloxanes represented by the formula:

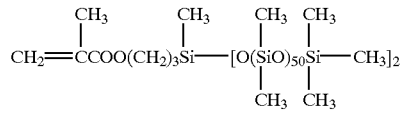

are known (see Japanese Patent Application Laid-open Nos. Hei 7-196975, Hei 1-319518 and Hei 1-254719). However, previous branched organpoolysiloxanes were limited to those having one branching point per molecule, and multiple branched organopolysiloxanes containing radical-polymerizable organic groups that have two or more branching points were not known.

Further, methods for improving the surface properties of organic polymers by copolymerizing a linear or branched organopolysiloxane containing 1 such radical-polymerizable organic group per molecule as a macro-monomer and a radical-polymerizable organic monomer are known (see Japanese Patent Application Laid-open Nos. Hei 7-196975, Hei 1-319518 and Hei 1-254719). However, there were problems with the silicone-containing organic polymers obtained in this way, in that compatibility with non-silicone-containing organic resins was low, and mechanical strength was low. Further, in order to obtain adequate surface-improvement properties by means of the silicone, it was necessary to copolymerize the aforesaid organopolysiloxane in comparatively large amounts and as a result the aforesaid problems became more pronounced.

Consequently, a purpose of the present invention is to provide a novel, muitiple branched siloxane-silalkylene copolymer which contains 1 radical-polymerizable organic group per molecule, and has a highly branched structure.

Further, a purpose of the present invention is to provide a silicone-containing organic polymer of high mechanical strength, good compatibility with organic resins, and having excellent surface-improvement properties, and a method for the production thereof.

DETAILED DESCRIPTION OF THE INVENTION

Firstly, the branched siloxane-silalkylene copolymer of the present invention is explained.

The branched siloxane-silalkylene copolymer of the present invention is represented by the general formula:

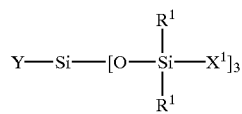

In the above formula, $R^1$ is 1–10 carbon alkyl or aryl, with the alkyl group being exemplified by methyl, ethyl, propyl, butyl, pentyl, isopropyl, isobutyl, cyclopentyl and cyclohexyl, and the aryl group being exemplified by phenyl and naphthyl. Among these, methyl and phenyl are preferable, and methyl is especially preferable. $X^1$ is a silyl-alkyl group represented by the following formula in the case when i=1.

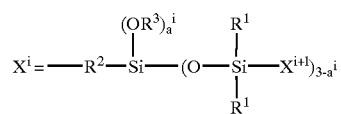

In the formula, $R^2$ is 2–10 carbon alkylene, and is exemplified by straight-chain alkylene such as ethylene, propylene, butylene and hexylene and by branched alkylene such as methylmethylene, methylethylene, 1-methyl pentylene and 1,4-dimethylbutylene. Among these, ethylene, methylmethylene, methylethylene, hexylene, 1-methyl pentylene and 1,4-dimethylbutylene are preferable. $R^3$ is 1–10 carbon alkyl, and is exemplified by methyl, ethyl, propyl, butyl, pentyl, isopropyl, isobutyl, cyclopentyl and cyclohexyl. Among these, methyl is preferable. $R^1$ is the same as aforesaid. $X^{i+1}$ is a group selected from the group comprising a hydrogen atom, 1–10 carbon alkyl, aryl and the aforesaid silylalkyl group. $a^i$ is an integer from 0 to 3, and the mean total number of $a^i$ in 1 molecule is preferably $1.5^i \times 3$ or less. i is an integer from 1 to 10, and this indicates the generation number of the said silylalkyl group, i.e. the number of repetitions of this silylalkyl group. Hence, if the generation number is 1, the branched siloxane-silalkylene copolymer of the present invention is represented by the general formula:

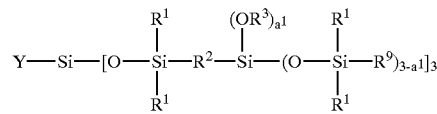

(in the formula, Y is as defined below, $R^1$, $R^2$ and $R^3$ are the same as aforesaid, and $R^9$ is a hydrogen atom or the same as the aforesaid $R^1$, and $a^1$ is the same as the aforesaid $a^i$), and if the generation number is 2, the branched siloxane-silalkylene copolymer of the present invention is represented by the general formula:

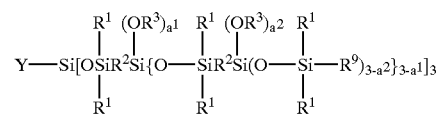

(in the formula, Y is as defined below, $R^1$, $R^2$, $R^3$ and $R^9$ are the same as aforesaid, and $a^1$ and $a^2$ are the same as the aforesaid $a^i$), and if the generation number is 3, the branched siloxane-silalkylene copolymer of the present invention is represented by the general formula:

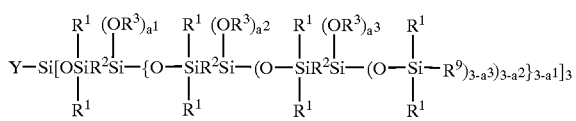

(in the formula, Y is as defined below, $R^1$, $R^2$, $R^3$ and $R^9$ are the same as aforesaid, and $a^1$, $a^2$ and $a^3$ are the same as the aforesaid $a^i$), Y is a radical-polymerizable organic group, and specifically, a (meth)-acryl group-containing organic group represented by the general formula:

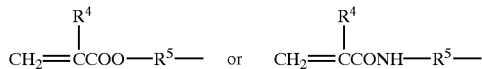

a styryl group-containing organic group represented by the general formula:

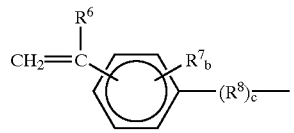

or 2–10 carbon alkenyl are mentioned. In the above formulae, $R^4$ and $R^6$ are a hydrogen atom or methyl. $R^5$ and $R^8$ are 1–10 carbon alkylene, exemplified by straight-chain alkylene such as methylene, ethylene, propylene, butylene, and hexylene and by branched alkylene such as methylmethylene, methylethylene, 1-methyl pentylene, and 1,4-dimethylbutylene, $R^7$ is 1–10 carbon alkyl, b is an integer from 0 to 4, and c is 0 or 1. As this radical-polymerizable group, for example acryloxymethyl, 3-acryloxypropyl, methacryloxymethyl, 3-methacryloxypropyl, 4-vinylphenyl, 3-vinylphenyl, 4-(2-propenyl)phenyl, 3-(2-propenyl)phenyl, 2-(4-vinyl -phenyl)ethyl, 2-(3-vinylphenyl)ethyl, vinyl, allyl, methallyl and 5-hexenyl are mentioned.

Such branched siloxane-silalkylene copolymers of the present invention are exemplified by the polymers represented by the following average molecular formulae:

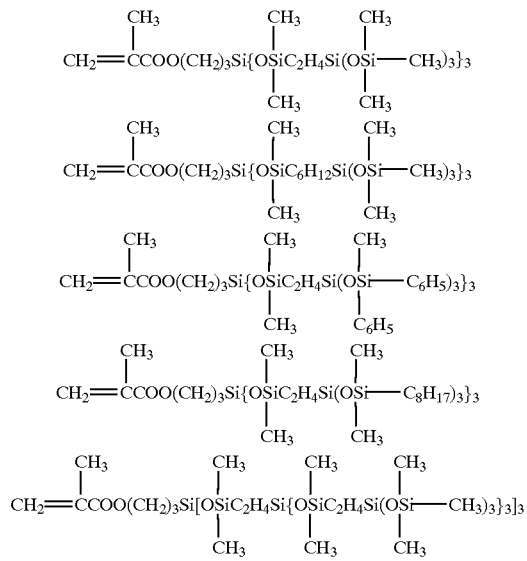

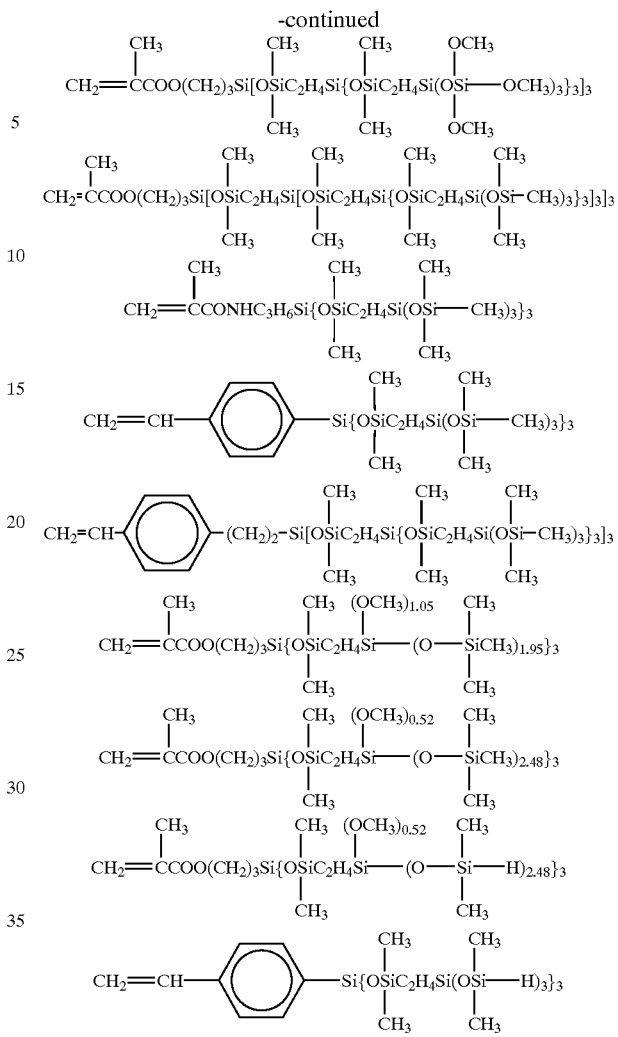

As a method for the production of such branched siloxane-silalkylene copolymers of the present invention, for example a method in which a silicon compound containing a silicon-bonded hydrogen atom represented by the general formula:

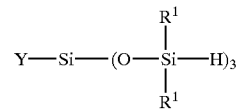

(in the formula, $R^1$ and Y are the same as aforesaid) and an alkenyl group-containing organo-silicon compound are subjected to a hydrosilylation reaction is mentioned. As the silicon compound represented by the above formula, for example, 3-methacryloxypropyltris-(dimethylsiloxy)silane, 3-acryloxypropyltris(dimethylsiloxy)silane, 4-vinylphenyltris-(dimethylsiloxy)-silane, 4-vinyltris (dimethylsiloxy)silane and 5-hexenyltris(dimethylsiloxy) -silane are used. As the alkenyl group-containing organo-silicon compound, for example, vinyltris(trimethylsiloxy) silane, vinyltris(dimethylphenylsiloxy)silane and 5-hexenyltris -(trimethylsiloxy)silane are used. This hydrosilylation reaction is preferably performed in the presence of a transition metal catalyst such as chloroplatinic acid or a platinum-olefin complex. Further, as regards the compounding ratio of the two, in order to prevent the carbon-carbon double bonds in the silicon-bonded hydrogen atom-containing silicon compound represented by the above formula from undergoing the hydrosilylation reaction, it is preferable to use more than the stoichiometric amount of the alkylene group-containing organosilicon compound.

Further, the branched siloxane-silalkylene copolymer of the present invention can also be produced by a method in which a silicon-bonded alkoxy group-containing organosilicon compound and a tetraalkyldisiloxane compound are reacted in the presence of an acidic aqueous solution and the major part of the alkoxy groups in the reaction product obtained are replaced by dialkylsiloxy groups. Moreover, by subjecting an alkylene group-containing organosilicon compound to a hydrosilylation reaction, in the same way as aforesaid, with the resulting branched siloxane-silalkylene copolymer of the present invention, the number of repetitions of the silylalkyl groups can be increased. Further, the silicon-bonded alkoxy group-containing organosilicon compound used in this method can be produced by subjecting a silicon-bonded hydrogen atom-containing silicon compound represented by the general formula:

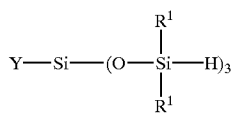

(in the formula, $R^1$ and Y are the same as aforesaid) and an alkylene group-containing alkoxy silane compound to a hydrosilylation reaction. The same compounds as aforesaid are used as the silicon-bonded hydrogen atom-containing silicon compounds and for example vinyl-trimethoxysilane, 5-hexenyltrimethoxysilane or vinyltriethoxysilane are used as the alkylene group-containing alkoxysilane compound.

Next, the silicone-containing organic polymer of the present invention is explained.

The silicone-containing organic polymer of the present invention is a polymer made by polymerizing (A) 0–99.9 weight parts of a radical-polymerizable organic monomer, and (B) 100–0.1 weight parts of a radical-polymerizable organic group-containing branched siloxane-silalkylene copolymer and represented by the general formula:

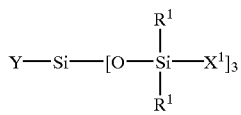

(in the formula, Y, $R^1$ and $X^1$ are the same as aforesaid).

There is no particular limitation as to the radical-polymerizable organic monomer component (A) used in the production of this silicone-containing organic polymer, provided that it is a monomer which has a radical-polymerizable group. This radical-polymerizable group is preferably vinyl, vinylene or vinylidene. As such radical-polymerizable organic monomers, for example, unsaturated carboxylic acid ester compounds such as methyl acrylate, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate, glycidyl acrylate, 2-hydroxyethyl acrylate, 2-hydroxypropyl acrylate, 2,2,3,3-tetrafluoropropyl acrylate, octafluoropentyl acrylate, methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl methacrylate, tetrahydrofurfuryl methacrylate, 2-hydroxyethyl methacrylate, 2-hydroxypropyl methacrylate, glycidyl methacrylate, 2-methoxyethyl methacrylate, 2-ethoxyethyl methacrylate and octafluoropentyl methacrylate; unsaturated aliphatic carboxylic acid compounds such as methacrylic acid and acrylic acid; unsaturated carboxylic acid amide compounds such as acrylamide, methacrylamide and N-methylolacrylamide; unsaturated aliphatic nitrile compounds such as acrylonitrile and methacrylonitrile; unsaturated aliphatic compounds such as vinyl acetate, vinyl propionate and vinyl versatate; unsaturated carboxylic acid anhydrides such as maleic anhydride and 4-methacryloxytrimellitic anhydride (4-META); halogenated vinyl compounds such as vinyl chloride and vinyl fluoride; aromatic vinyl compounds such as styrene, methylstyrene, vinyltoluene and vinylpyridine; and aliphatic diene compounds such as butadiene and isoprene are mentioned. These radical-polymerizable organic monomers such as the aforesaid can be used singly and, further, mixtures of 2 or more can also be used.

The component (B) essential in the production of the silicone-containing organic polymer of the present invention is a radical-polymerizable organic group-containing branched siloxane-silalkylene copolymer represented by the aforesaid general formula.

Concerning the ratio of the aforesaid component (A) and component (3) polymerized in the production of the silicone-containing organic polymer of the present invention, the weight ratio of component (A) to component (B) is in the range from 0:100 to 99.9:0. 1, and is preferably in the range from 1:99 to 99:1. Further, the statement that the first component is 0 weight parts means that a silicone-containing organic polymer of the present invention can be a homopolymer of component (B).

There is no particular limitation as to the polymerization method for the production of the silicone-containing organic polymer of the present invention, but usually a radical polymerization method or an ionic polymerization method is used. Of these, the radical polymerization method is preferably used, and in particular, the solution polymerization method is ideally used. Solution polymerization is generally performed by reacting 0–99.9 weight parts of component (A) and 100–0.1 weight parts of component (B), in a solvent, in the presence of a radical initiator, for 3–20 hours at 50 to 150° C. Solvents used for this are exemplified by aliphatic hydrocarbons such as hexane, octane, decane and cyclohexane; aromatic hydro carbons such as benzene, toluene and xylene; ethers such as diethyl ether, dibutyl ether, tetrahydrofuran and dioxane; ketones such as acetone, methyl ethyl ketone, methyl isobutyl ketone and diisobutyl ketone; and esters such as methyl acetate, ethyl acetate, butyl acetate and isobutyl acetate. Of these, toluene or xylene is ideally used. As the radical initiator, any previously known substance normally used in the radical polymerization method is used, and these are specifically exemplified by azobis compounds such as 2,2'-azobis(isobutyronitrile), 2,2'-azobis(2-methylbutyronitrile) and 2,2'-azobis(2,4-dimethylvaleronitrile); and organic peroxides such as benzoyl peroxide, lauroyl peroxide, tert-butyl peroxybenzoate and tert-butyl peroxy-2-ethylhexanoate. One of these radical initiators can be used alone; further, a mixture of two or more may be used. The quantity of radical initiator used is preferably in the range 0.1 to 5 weight parts per 100 total weight parts of the aforesaid component (A) and component (B). Further, chain transfer agents can be also added when the silicone-containing organic polymer of the present invention is produced. As such chain extenders, specifically, mercapto compounds such as 2-mercaptoethanol, butyl mercaptan, n-dodecyl mercaptan and 3-mercaptopropyltrimethoxysilane; and halogenated compounds such as methylene chloride, chloroform, carbon tetrachloride, butyl bromide and 3-chloropropyltrimethoxysilane are mentioned.

EXAMPLES

Figure 1:
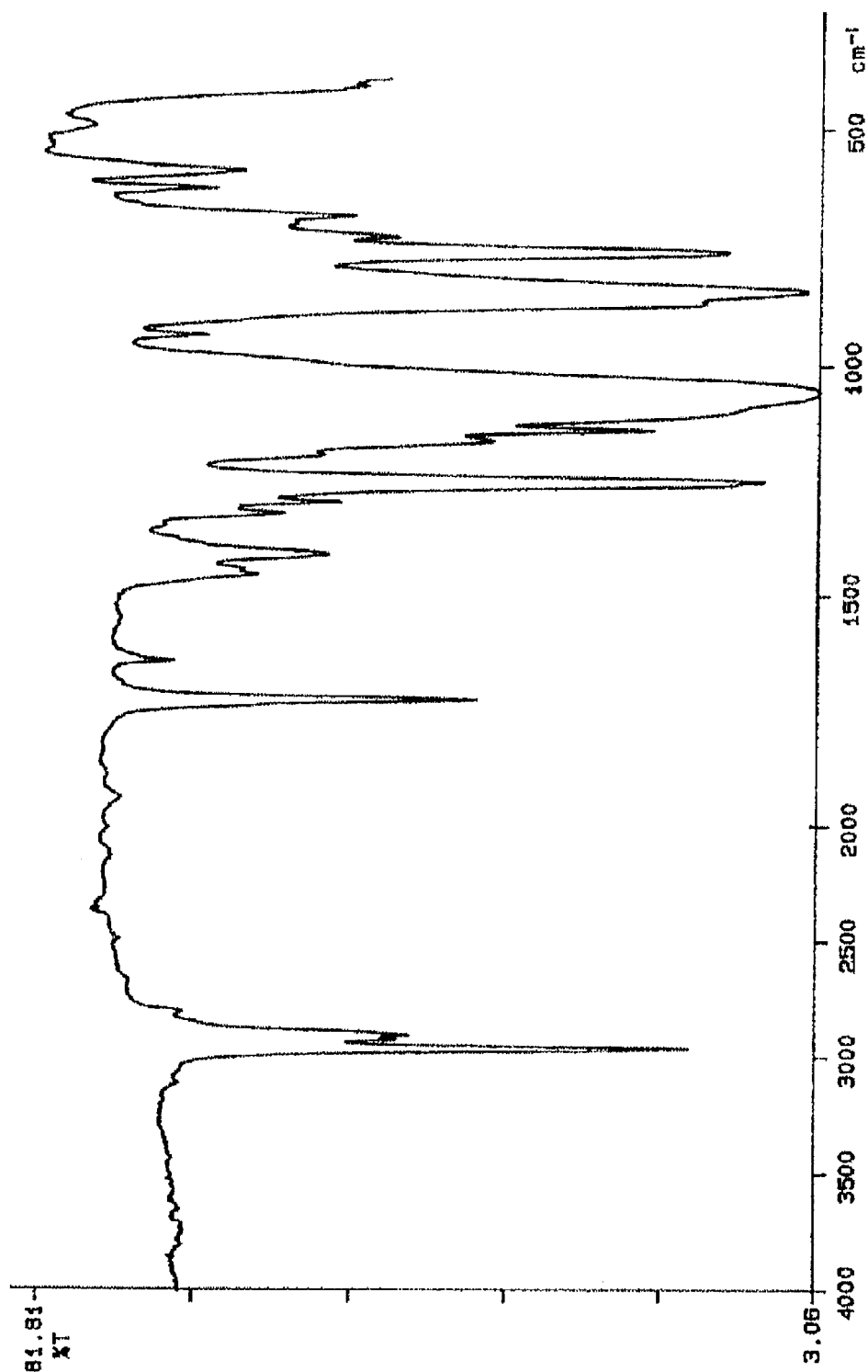
FIG. 1 is an infrared absorption spectrum of the branched siloxane-silalkylene copolymer obtained in Example 1.
Figure 2:
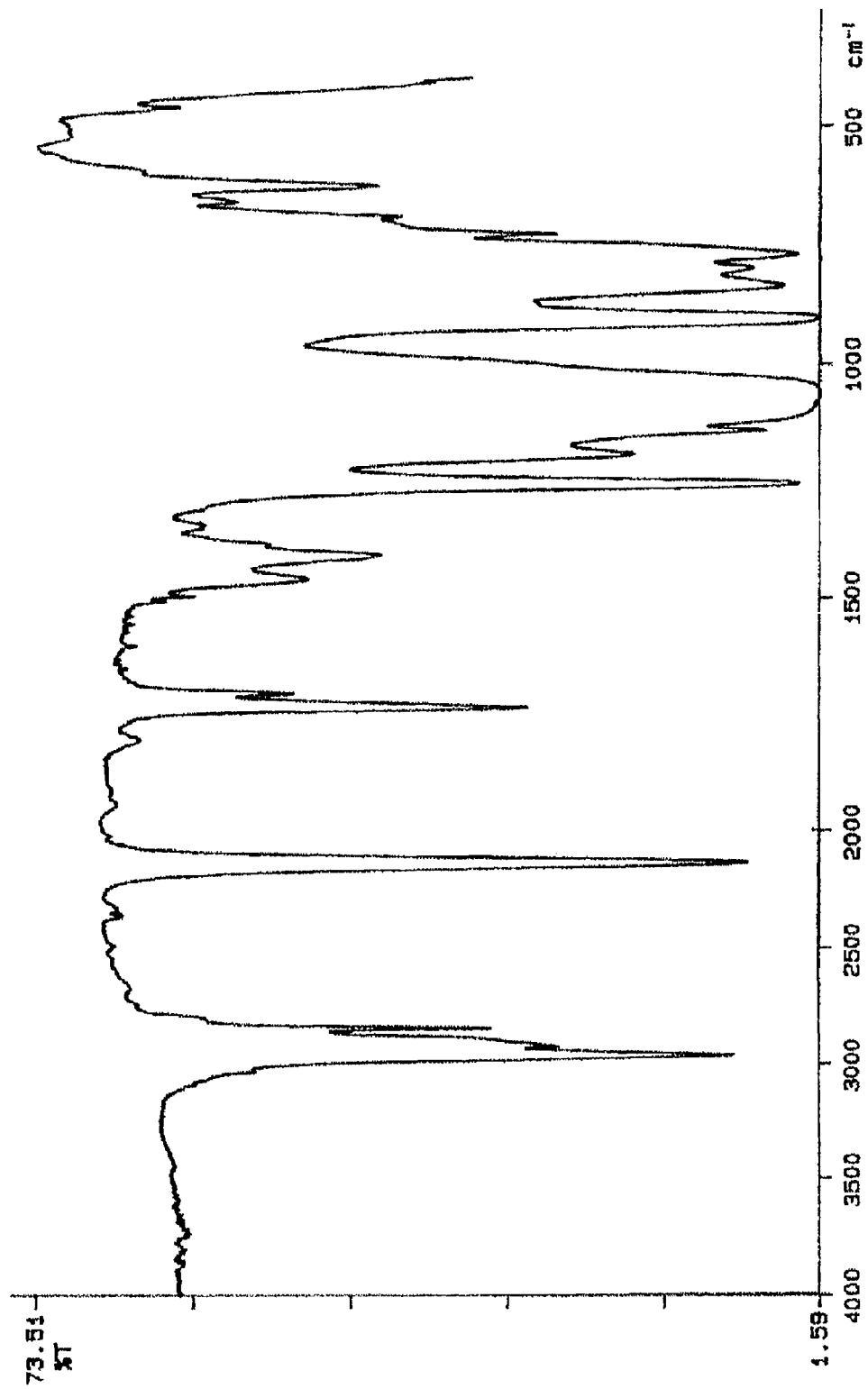
FIG. 2 is an infrared absorption spectrum of the branched siloxane-silalkylene copolymer obtained in Example 2.
Figure 3:
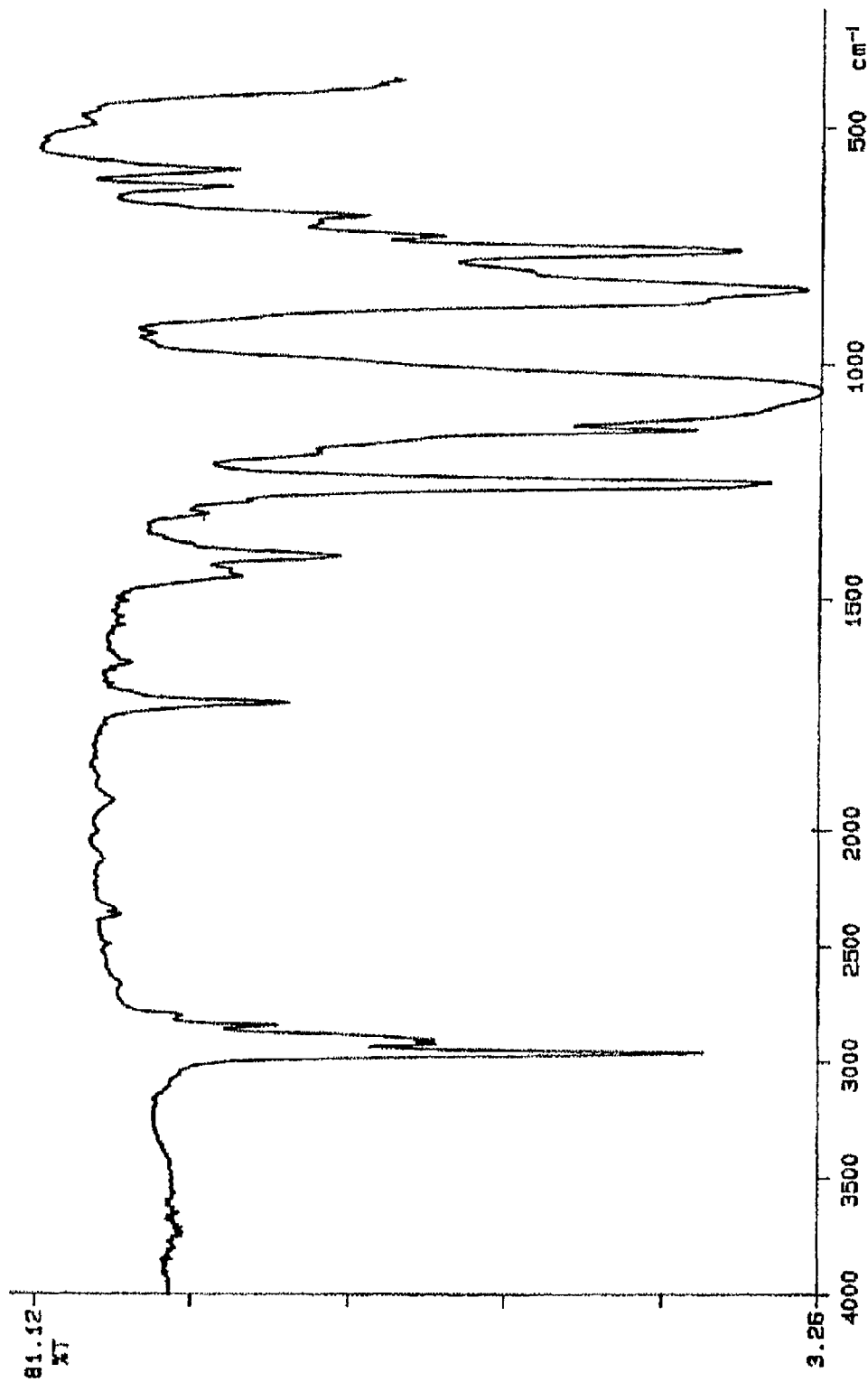
FIG. 3 is an infrared absorption spectrum of the branched siloxane-silalkylene copolymer obtained in Example 3.
Figure 4:
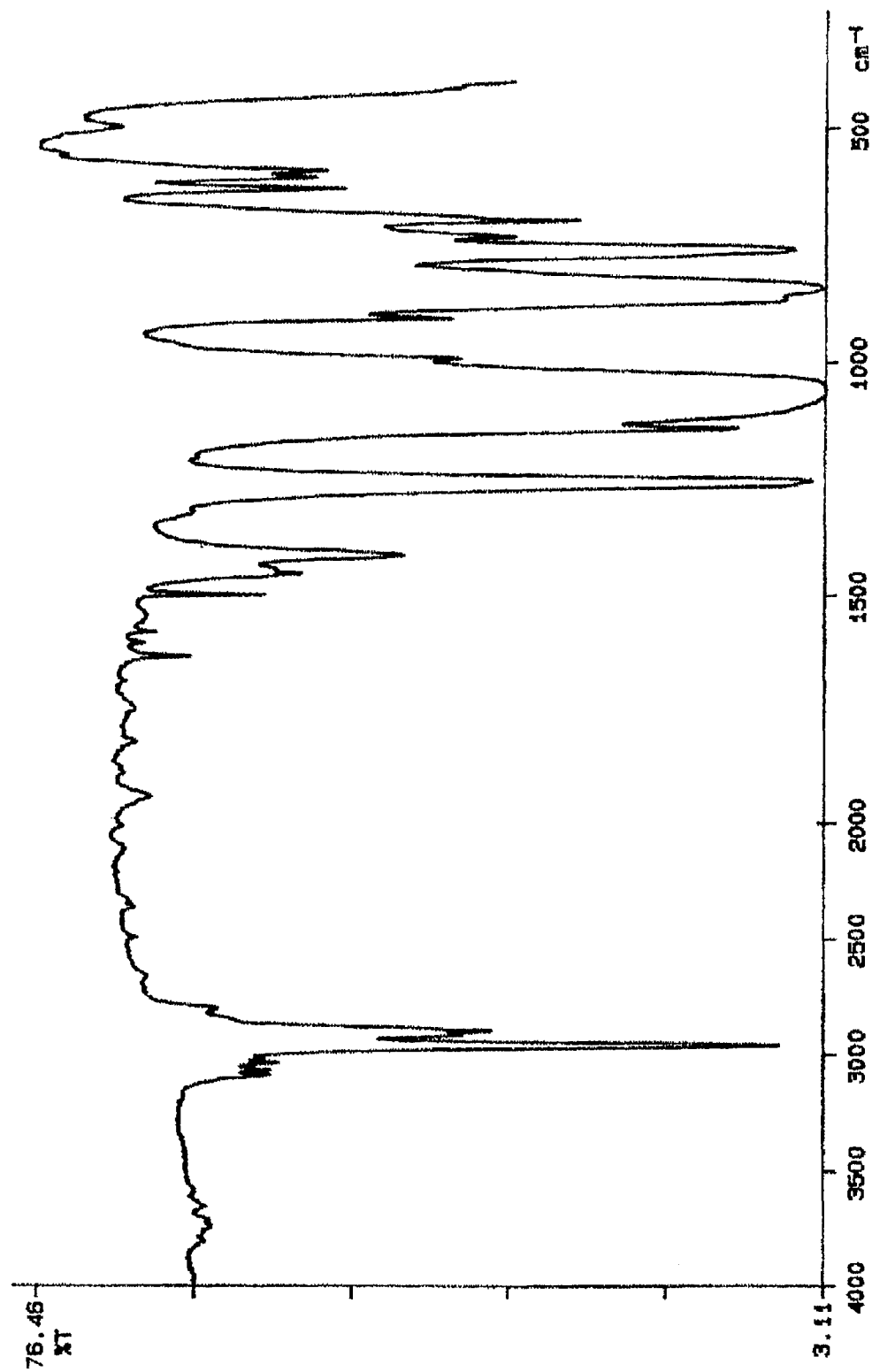
FIG. 4 is an infrared absorption spectrum of the branched siloxane-silalkylene copolymer obtained in Example 4.
Figure 5:
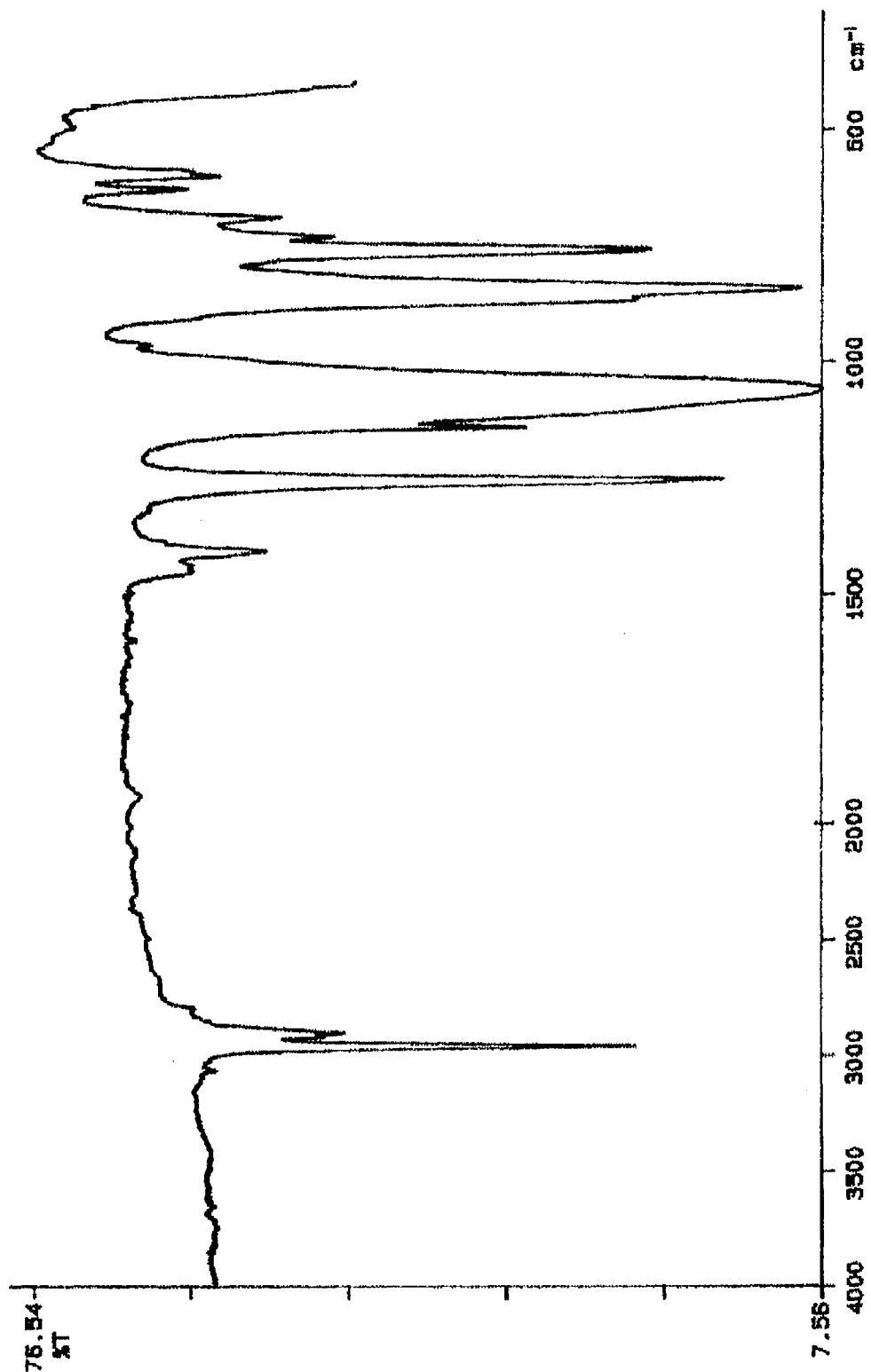
FIG. 5 is an infrared absorption spectrum of the branched siloxane-silalkylene copolymer obtained in Example 5.
Figure 6:
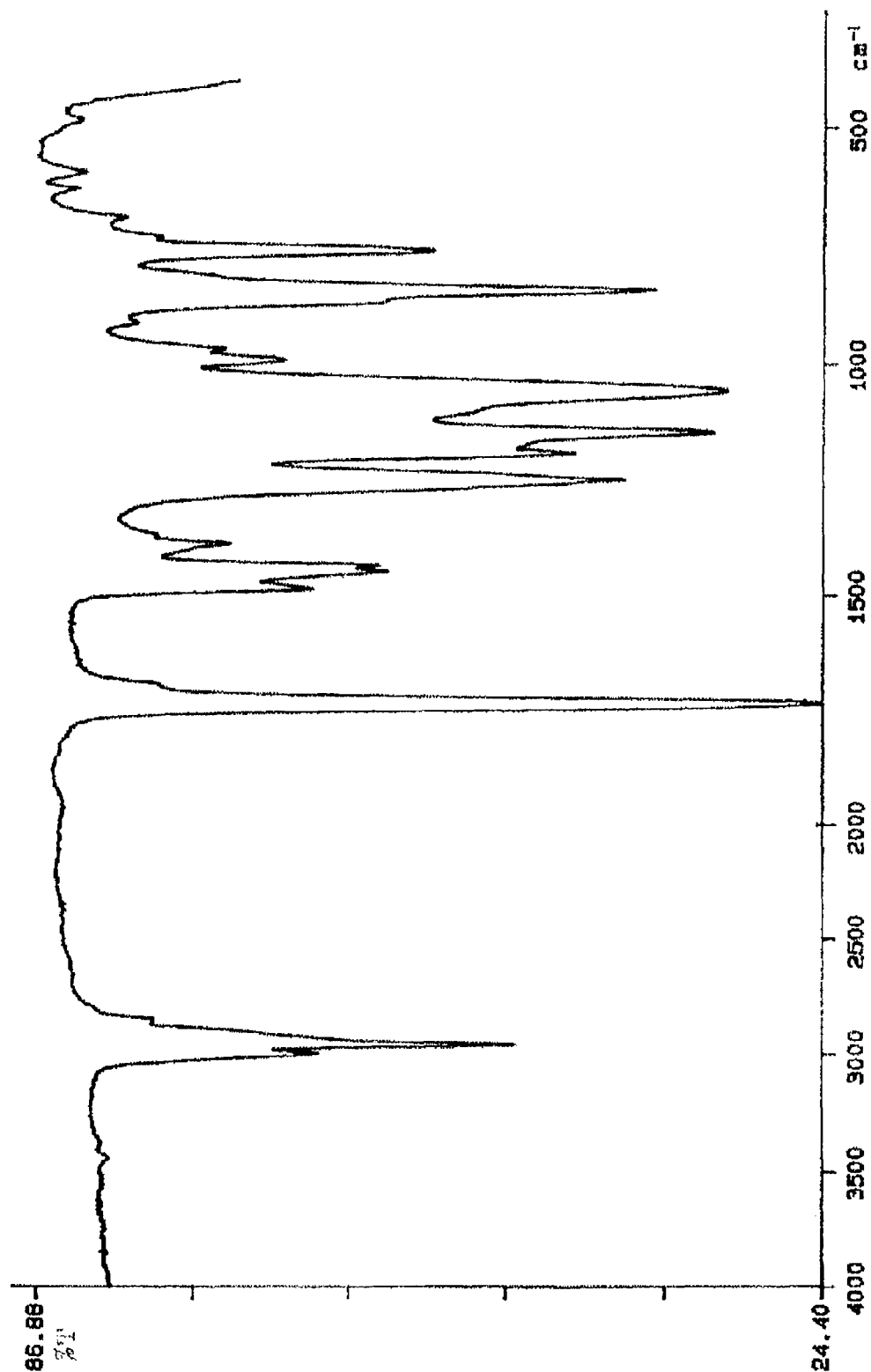
FIG. 6 is an IR spectrum of the silicone-containing organic polymer obtained in Example 6.
Figure 7:
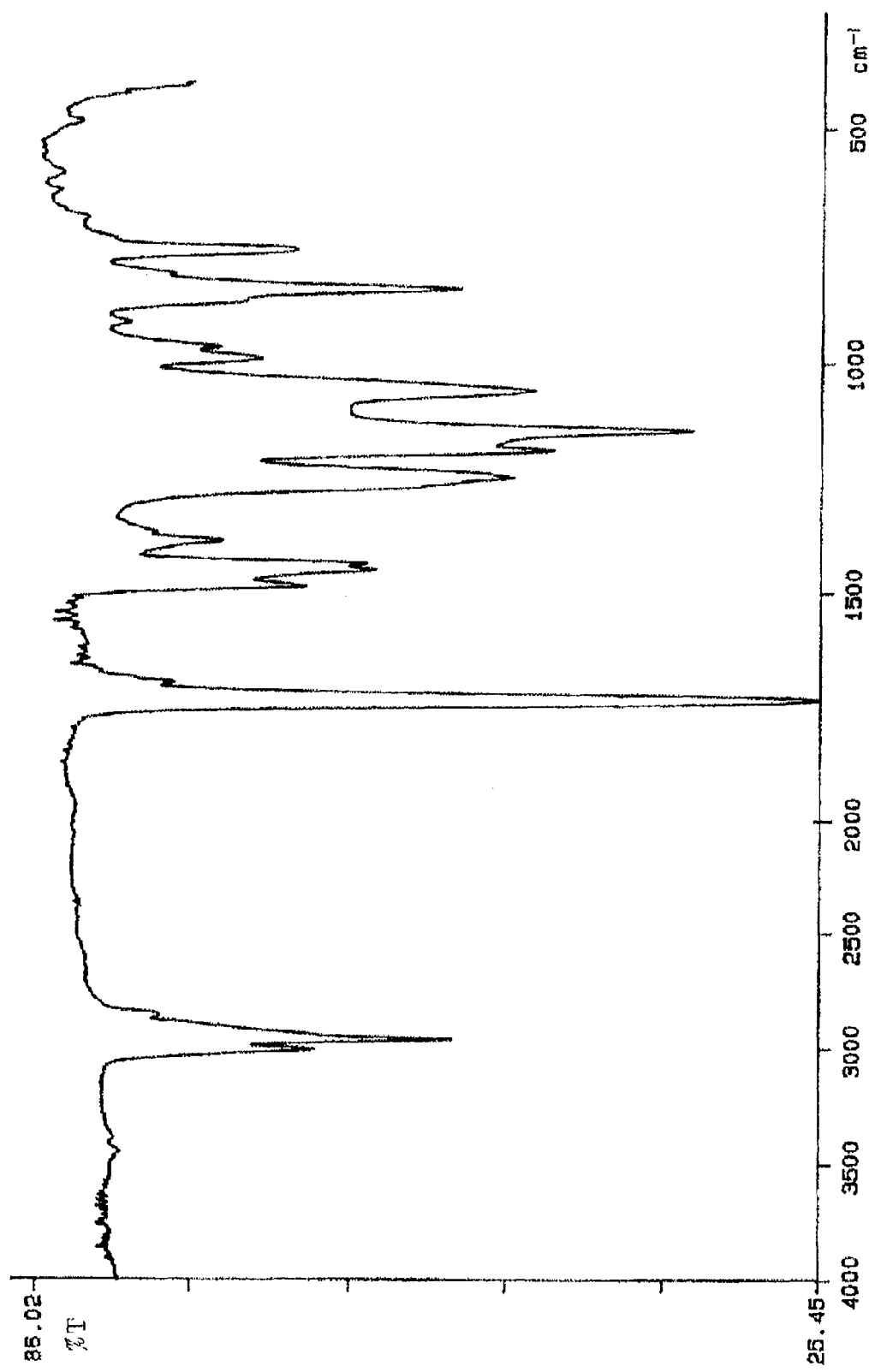
FIG. 7 is an IR spectrum of the silicone-containing organic polymer obtained in Example 7.

Below, the present invention is illustrated in more detail by means of examples.

Example 1

113.0 g of vinyltris(trimethylsiloxy)silane and 0.04 g of a 3% isopropanol solution of chloroplatinic acid were placed in a 200 ml 4-neck flask fitted with stirring device, thermometer, reflux condenser and dropping funnel, and this was heated to 100° C. with stirring. Next, 38.1 g of 3-methacryloxypropyltris(dimethylsiloxy)silane were added dropwise to this slowly using the dropping funnel, so as to maintain the reaction temperature at 100–110°C. After completion of the dropwise addition, the reaction solution was heated for 1 hour at 120° C. After cooling, the reaction solution was transferred to a pear-shaped flask, and on concentration under reduced pressure on the rotary evaporator, 132.8 g of a colorless transparent liquid were obtained. On analysis of this liquid by $^{29}$Si nuclear magnetic resonance (below: $^{29}$Si-NMR), $^{13}$C-nuclear magnetic resonance (below: $^{13}$C-NMR), infrared absorption spectrum (below: IR) and gel permeation chromatography (below: GPC), it was confirmed that this was the branched siloxane-silalkylene copolymer represented by the slowing average molecular formula:

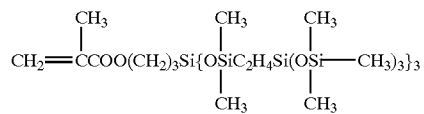

Example 2

74.1 g of vinyltrimethoxysilane and 0.02 g of a 3% isopropanol solution of chloroplatinic acid were placed in a 200 ml 4-neck flask fitted with stirring device, thermometer, reflux condenser and dropping funnel, and this was heated to 100° C. with stirring. Next, 38.1 g of 3-methacryloxypropyltris(dimethylsiloxy)silane were added dropwise to this slowly using the dropping funnel, so as to maintain the reaction temperature at 100–110° C. After completion of the dropwise addition, the reaction solution was heated for 1 hour at 120° C. After cooling, the reaction solution was transferred to a pear-shaped flask, and on concentration under reduced pressure on the rotary evaporator, 82.5 g of a pale brown transparent liquid were obtained. Meanwhile, 40.3 g of 1,1,3,3-tetramethyldisiloxane, 30 ml of concentrated sulfuric acid, 60 ml of water and 60 ml of isopropanol were placed in a 300 ml 4-neck flask fitted with stirring device, thermometer, reflux condenser and dropping funnel, and these were stirred. Next, 27.6 g of the pale brown transparent liquid obtained as aforesaid were added dropwise to this slowly over 1 hour using the dropping funnel. After completion of the dropwise addition, the reaction solution was stirred for 1 hour at room temperature. After completion of the stirring, the reaction solution was transferred to a separating funnel, and after removal of the lower layer, the upper layer that remained was washed twice with 200 ml of water, and once with 50 ml of aqueous saturated sodium hydrogen carbonate solution, and then dried with anhydrous magnesium sulfate. This was filtered, and then the filtrate was transferred to a pear-shaped flask, and on concentration under reduced pressure on the rotary evaporator 41.6 g of a colorless transparent liquid were obtained. On analysis of this liquid by $^{29}$Si-NMR, $^{13}$C-NMR, IR and GPC, it was confirmed that this was the branched siloxane-silalkylene copolymer represented by the following average molecular formula:

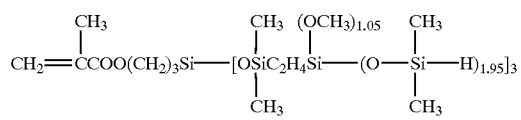

Example 3

113.0 g of vinyltris(trimethylsiloxy)silane and 0.04 g of a 3% isopropanol solution of chloro platinic acid were placed in a 200 ml 4-neck flask fitted with stirring device, thermometer, reflux condenser and dropping funnel, and this was heated to 100° C. with stirring. Next, 34.7 g of the branched siloxane-silalkylene copolymer obtained in Example 2 were added dropwise to this slowly using the dropping funnel, so as to maintain the reaction temperature at 100–110° C. After completion of the dropwise addition, the reaction solution was heated for 1 hour at 120° C. After cooling, the reaction solution was transferred to a pear-shaped flask, and on concentration under reduced pressure on the rotary evaporator, 95.6 g of a colorless transparent liquid were obtained. On analysis of this liquid by $^{29}$Si-NMR, $^{13}$C-NMR, IR and GPC, it was confirmed that this was the branched siloxane-silalkylene copolymer represented by the following average molecular formula:

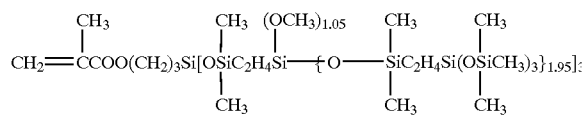

Example 4

322.0 g of vinyltris(trimethylsiloxy)silane and 0.07 g of a 3% isopropanol solution of chloroplatinic acid were placed in a 500 ml 4-neck flask fitted with stirring device, thermometer, reflux condenser and dropping funnel, and this was heated to 100° C. with stirring. Next, 35.6 g of 4-vinylphenyltris(dimethylsiloxy)silane were added dropwise to this slowly using the dropping funnel, so as to maintain the reaction temperature at 100–110° C. After completion of the dropwise addition, the reaction solution was heated for 1 hour at 120° C. After cooling, the reaction solution was transferred to a pear-shaped flask, and on concentration under reduced pressure on the rotary evaporator, 126.9 g of a colorless transparent liquid were obtained. On analysis of this liquid by $^{29}$Si-NMR, $^{13}$C-NMR, IR and GPC, it was confirmed that this was the branched siloxane-silalkylene copolymer represented by the following average molecular formula:

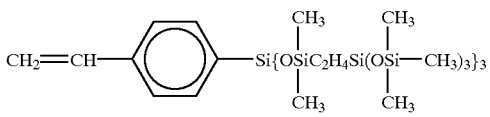

Example 5

322.0 g of vinyltris(trimethylsiloxy)silane and 0.07 g of a 3% isopropanol solution of chloroplatinic acid were placed in a 500 ml 4-neck flask fitted with stirring device, thermometer, reflux condenser and dropping funnel and this was heated to 100° C. with stirring. Next, 28.0 g of vinyltris (dimethylsiloxy)silane were added dropwise to this slowly using the dropping funnel, so as to maintain the reaction temperature at 100–110° C. After completion of the dropwise addition, the reaction solution was heated for 1 hour at 120° C. After cooling, the reaction solution was transferred to a pear-shaped flask, and on concentration under reduced pressure on the rotary evaporator, 123.3 g of a colorless transparent liquid were obtained. On analysis of this liquid by $^{29}$Si-NMR, $^{13}$C-NMR, IR and GPC, it was confirmed that this was the branched siloxane-silalkylene copolymer represented by the following average molecular formula:

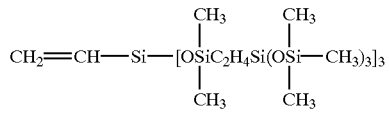

Example 6

18.0 g of methyl methacrylate monomer, 12.0 g of the methacryl group-containing branched siloxane-silalkylene copolymer obtained in Example 1 and 90 g of toluene w ere placed in a 200 ml 4-neck flask fitted with stirring device, thermometer, reflux condenser and dropping funnel, and these were heated to 70° C. under a nitrogen atmosphere with stirring. Then 0.3 g of α,α'-azobisisobutyronitrile (below: AIBN) were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 24.1 g of a colorless transparent solid silicone-containing organic polymer were obtained.

A toluene solution was prepared by dissolving 2 g of the silicone-containing organic polymer thus obtained in 18 g of toluene. This was applied onto a glass plate using a spin-coater, and air-dried, and the contact angle with water of the coating film obtained was measured. Also, the pencil hardness was measured by rubbing this coating film with lead pencils. Further, 5 g of the aforesaid silicone-containing organic polymer and 20 g of polymethyl methacrylate resin (below: PMMA resin) were dissolved in 100 g of toluene, and then a coating film was made by applying this onto a glass plate and air-drying. By measuring the transparency of the coating film obtained by eye, the compatibility of the silicone-containing organic polymer of the present invention with PMMA was assessed. These measurement results are shown in Table 1.

Example 7

24.0 g of methyl methacrylate monomer, 6.0 g of the methacryl group-containing branched siloxane-silalkylene copolymer obtained in Example 1 and 90 g of toluene were placed in a 200 ml 4-neck flask fitted with stirring device, thermometer, reflux condenser and dropping funnel, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.3 g of a colorless transparent solid silicone-containing organic polymer were obtained.

The contact angle with water, pencil hardness and compatibility with PMMA resin of the silicone-containing organic polymer thus obtained were measured in the same way as in Example 6. These measurement results are shown in Table 1.

Example 8

27.0 g of methyl methacrylate monomer, 3.0 g of the methacryl group-containing branched siloxane-silalkylene copolymer obtained in Example 1 and 90 g of toluene were placed in a 200 ml 4-neck flask fitted with stirring device, thermometer, reflux condenser and dropping funnel, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.9 g of a colorless transparent solid silicone-containing organic polymer were obtained.

The contact angle with water, pencil hardness and compatibility with PMMA resin of the silicone-containing organic polymer thus obtained were measured in the same way as in Example 6. These measurement results are shown in Table 1.

Example 9

29.1 g of methyl methacrylate monomer, 0.9 g of the methacryl group-containing branched siloxane-silalkylene copolymer obtained in example 1 and 90 g of toluene were placed in a 200 ml 4-neck flask fitted with stirring device, thermometer, reflux condenser and dropping funnel, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.5 g of a colorless transparent solid silicone-containing organic polymer were obtained.

The contact angle with water, pencil hardness and compatibility with PMMA resin of the silicone-containing organic polymer thus obtained were measured in the same way as in Example 6. These measurement results are shown in Table 1.

Example 10

18.0 g of methyl methacrylate monomer, 12.0 g of the methacryl group-containing branched siloxane-silalkylene copolymer obtained in Example 3 and 90 g of toluene were placed in a 200 ml 4-neck flask fitted with stirring device, thermometer, reflux condenser and dropping funnel, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.5 g of a colorless transparent solid silicone-containing organic polymer were obtained.

The contact angle with water, pencil hardness and compatibility with PMMA resin of the silicone-containing organic polymer thus obtained were measured in the same way as in Example 6. These measurement results are shown in Table 1.

Example 11

27.0 g of methyl methacrylate monomer, 3.0 g of the styryl group-containing branched siloxane-silalkylene copolymer obtained in Example 4 and 90 g of toluene were placed in a 200 ml 4-neck flask fitted with stirring device, thermometer, reflux condenser and dropping funnel, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.5 g of a colorless transparent solid silicone-containing organic polymer were obtained.

The contact angle with water, pencil hardness and compatibility with PMMA resin of the silicone-containing organic polymer thus obtained were measured in the same way as in Example 6. These measurement results are shown in Table 1.

Comparative Example 1

30.0 g of methyl methacrylate monomer and 90 g of toluene were placed in a 200 ml 4-neck flask fitted with stirring device, thermometer and reflux condenser, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 25.8 g of a colorless transparent solid organic polymer were obtained. The contact angle with water and pencil hardness of the organic polymer thus obtained were measured in the same way as in example 6. These measurement results are shown in Table 1.

Comparative Example 2

24.0 g of methyl methacrylate monomer, 6.0 g of a polydimethylsiloxane of which only one end is blocked with a methacryl group and represented by the formula:

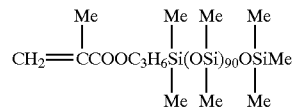

(in the formula, Me signifies a methyl group) and 90 g of toluene were placed in a 200 ml 4-neck flask fitted with stirring device, thermometer and reflux condenser, and these were heated to 70° C. under a nitrogen atmosphere with stirring. Then 0.3 g of AIBN were added to this, and it was heated and stirred for 6 hours. Next, some of the toluene was removed by heating and stirring under reduced pressure on the aspirator. The remaining reaction solution was thrown into a large excess of methanol, stirred and then allowed to stand, and on separating the precipitate, and drying under reduced pressure, 23.1 g of a colorless transparent solid organic polymer were obtained.

The contact angle with water, pencil hardness and compatibility with PMMA resin of the organic polymer thus obtained were measured in the same way as in Example 6. These measurement results are shown in Table 1.

TABLE 1

|  | Contact angle with water | Pencil hardness | Compatibility with PMMA resin |
| --- | --- | --- | --- |
| Example 6 | 107 | 2H | ○ |
| Example 7 | 107 | 2H | ◎ |
| Example 8 | 105 | 3H | ◎ |
| Example 9 | 100 | 3H | ◎ |
| Example 10 | 107 | 2H | ○ |
| Example 11 | 107 | H | ○ |
| Comparative Example 1 | 73 | 3H | — |
| Comparative Example 2 | 100 | HB | x |

Compatibility with PMMA Resin

◎: Coating film was uniformly transparent

○: Coating film was semi-transparent x: Coating film had become cloudy.

As stated above, the radical-polymerizable organic group-containing branched siloxane-silalkylene copolymer of the present invention is a novel multiple branched compound having a highly branched structure. This copolymer is highly compatible with non-silicone organic resins, and can be used as a macromonomer in copolymerisation raw materials for various organic resins.

Further, the silicone-containing organic polymer of the present invention obtained by subjecting the branched siloxane-silalkylene copolymer and a radical-polymerizable organic monomer to a polymerization reaction has the advantage that it has high mechanical strength and good compatibility with organic resins, and excellent surface-improvement properties. The production method of the present invention has the characteristic that the silicone-containing organic polymer is obtained with good productivity.

What is claimed is:

1. A branched siloxane-silalkylene copolymer represented by the general formula:

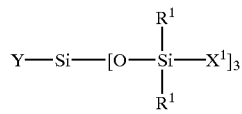

wherein Y is a radical-polymerizable organic group, $R^1$ is 1–10 carbon alkyl or aryl, and $X^1$ is a silylalkyl group represented by the following formula when i=1:

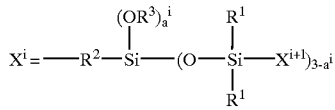

wherein $R^1$ is the same as above, $R^2$ is 2–10 carbon alkylene, $R^3$ is 1–10 carbon alkyl, and $X^{i+1}$ is selected from the group consisting of a hydrogen atom, 1–10 carbon alkyl, aryl and the $X^1$ silylalkyl group above, i, which indicates a generation number of the $X^1$ silylalkyl group above, is an integer from 1 to 10, and $a^i$ is an integer from 0 to 3.

2. The branched siloxane-silalkylene copolymer according to claim 1 in which the radical-polymerizable organic group Y is selected from the group consisting of a (meth) acryl group-containing organic group represented by the general formulae:

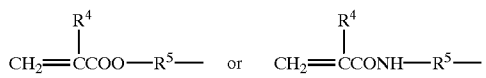

wherein $R^4$ is a hydrogen atom or methyl and $R^5$ is 1–10 carbon alkylene, a styryl group-containing organic group represented by the general formula:

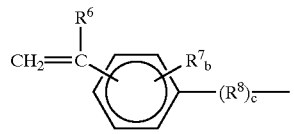

wherein $R^6$ is a hydrogen atom or methyl, $R^7$ is 1–10 carbon alkyl, $R^8$ is 1–10 carbon alkylene, b is an integer from 0 to 4 and c is 0 or 1, and 2–10 carbon alkenyl.

3. A silicone-containing organic polymer made by polymerizing (A) 0–99.9 parts by weight of a radical-polymerizable organic monomer and (B) 100–0.1 parts by weight of a radical-polymerizable organic group-containing branched siloxane-silalkylene copolymer represented by the general formula:

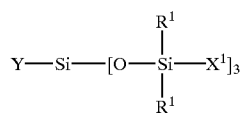

wherein Y is a radical-polymerizable organic group, $R^1$ is 1–10 carbon alkyl and $X^1$ is a silylalkyl group represented by the following formula when i=1:

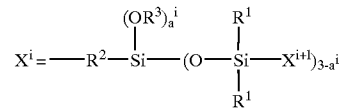

wherein $R^1$ is the same as above, $R^2$ is 2–10 carbon alkylene, $R^3$ is 1–10 carbon alkyl, and $X^{i+1}$ is selected from the group consisting of a hydrogen atom, 1–10 carbon alkyl, aryl and the aforesaid $X^1$ silylalkyl group, i, which indicates a generation number of the $X^1$ silylalkyl group above, is an integer from 1 to 10, and $a^i$ is an integer from 0 to 3.

4. The silicone-containing organic polymer according to claim 3 in which the radical-polymerizable organic group Y is selected from the group consisting of a (meth)acryl group-containing organic group represented by the general formulae:

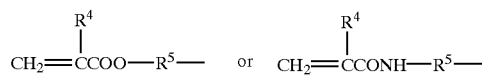

wherein $R^4$ is a hydrogen atom or methyl and $R^5$ is 1–10 carbon alkylene, a styryl group-containing organic group represented by the general formula:

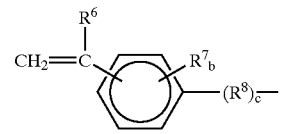

wherein $R^6$ is a hydrogen atom or methyl, $R^7$ is 1–10 carbon alkyl, $R^8$ is 1–10 carbon alkylene, b is an integer from 0 to 4 and c is 0 or 1, and 2–10 carbon alkenyl.

5. A method for production of a silicone-containing organic polymer by radical copolymerization, wherein the silicone containing organic polymer is made by polymerizing (A) 0–99.9 parts by weight of a radical-polymerizable organic monomer and (B) 100–0.1 parts of a radical-polymerizable organic group-containing branched siloxane-silalkylene copolymer represented by the general formula:

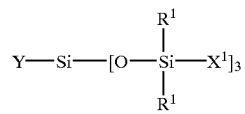

wherein Y is a radical-polymerizable organic group, $R^1$ is 1–10 carbon alkyl and $X^1$ is a silylalkyl group represented by the following formula when i=1:

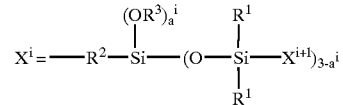

wherein $R^1$, is the same as above, $R^2$ is 2–10 carbon alkylene, $R^3$ is 1–10 carbon alkyl and $X^{i+1}$ is selected from the group consisting of a hydrogen atom, 1–10 carbon alkyl, aryl and the above $X^1$ silylalkyl group, i, which indicates a generation number of the $X^1$ silylalkyl group above, is an integer from 1 to 10, and $a^i$ is an integer from 0 to 3.

* * * * *